(12) United States Patent
Krause

(10) Patent No.: US 10,913,663 B2
(45) Date of Patent: Feb. 9, 2021

(54) SYSTEMS AND METHODS FOR CONTROLLING WATERBORNE PATHOGENS

(71) Applicant: John David Krause, Bainbridge, GA (US)

(72) Inventor: John David Krause, Bainbridge, GA (US)

( * ) Notice: Subject to any disclaimer, the term of this patent is extended or adjusted under 35 U.S.C. 154(b) by 236 days.

(21) Appl. No.: 15/993,928

(22) Filed: May 31, 2018

(65) Prior Publication Data

US 2019/0233306 A1     Aug. 1, 2019

Related U.S. Application Data

(60) Provisional application No. 62/623,624, filed on Jan. 30, 2018.

(51) Int. Cl.
| | | |
|---|---|---|
| *B01D 39/20* | (2006.01) | |
| *C02F 1/00* | (2006.01) | |
| *C02F 1/20* | (2006.01) | |
| *C02F 1/28* | (2006.01) | |
| *C02F 5/02* | (2006.01) | |
| *C02F 7/00* | (2006.01) | |
| *C02F 9/00* | (2006.01) | |
| *C02F 103/02* | (2006.01) | |

(52) U.S. Cl.
CPC ............ *C02F 1/20* (2013.01); *C02F 7/00* (2013.01); *C02F 9/00* (2013.01); *B01D 39/2055* (2013.01); *B01D 2101/02* (2013.01); *C02F 2103/02* (2013.01); *C02F 2303/20* (2013.01); *C02F 2307/10* (2013.01); *C02F 2307/14* (2013.01)

(58) Field of Classification Search
CPC .. B01D 39/2055; B01D 2101/02; C02F 1/001; C02F 1/20; C02F 1/283; C02F 5/02; C02F 7/00; C02F 9/00; C02F 2103/02; C02F 2303/20; C02F 2307/10; C02F 2307/14
See application file for complete search history.

(56) References Cited

U.S. PATENT DOCUMENTS

| | | | |
|---|---|---|---|
| 4,220,535 A |   | 9/1980 | Leonard |
| 4,627,921 A | * | 12/1986 | Meyers ................... C02F 1/283 |
| | | | 210/668 |
| 5,264,171 A |   | 11/1993 | Prasad et al. |
| 5,352,361 A |   | 10/1994 | Prasad et al. |
| 5,584,914 A | * | 12/1996 | Senoo ................ B01D 19/0031 |
| | | | 96/6 |

(Continued)

*Primary Examiner* — Lucas A Stelling
(74) *Attorney, Agent, or Firm* — Nixon & Vanderhye P.C.

(57) ABSTRACT

Systems and methods to control colonization, amplification and/or growth of waterborne aerobic heterotrophic bacteria within potable water plumbing of a premises are provided, the premises having potable water plumbing having at least one point of use within the premises, the potable water plumbing being adapted to receive a potable water supply from a municipal water source. The systems and methods to control colonization, amplification, and/or growth of waterborne aerobic heterotrophic bacteria within cooling towers and evaporative condensers, recirculates system water through a deoxygenation device to reduce dissolved oxygen levels and prevent bacterial respiration within the heat exchanger and pressurized lines.

8 Claims, 2 Drawing Sheets

(56) References Cited

U.S. PATENT DOCUMENTS

2005/0132488 A1* 6/2005 Biondo .............. A61H 33/0087
4/541.1
2007/0090030 A1* 4/2007 Teran ........................ C02F 3/30
210/86

\* cited by examiner

SYSTEMS AND METHODS FOR CONTROLLING WATERBORNE PATHOGENS

CROSS-REFERENCE TO RELATED APPLICATION

This application is related to and claims domestic priority benefits from U.S. Provisional Patent Application Ser. No. 62/623,624 filed on Jan. 30, 2018, the entire content of which is expressly incorporated hereinto by reference.

FIELD

The embodiments disclosed herein relate generally to systems and methods which employ a membrane contactor or like device that is capable of removing dissolved oxygen from water to thereby prevent and/or control the cellular respiration, amplification and/or colonization of waterborne pathogens, e.g., aerobic heterotrophic pathogenic bacteria, such as *Legionella* and *Pseudomonas*, in premise plumbing systems, cooling towers, and evaporative condensers used in commercial, residential, industrial, or health care buildings. The anoxic water obtained by the systems and methods is useful to disrupt established aerobic bacterial colonization and its protective biofilm that may exist in premise plumbing systems.

BACKGROUND

Contactors capable of separating fluids are known, for example see U.S. Pat. Nos. 4,220,535; 5,264,171; and 5,352,361, each being expressly incorporated herein by reference. These known contactors consist of a perforated center tube, a plurality of hollow fiber membranes surrounding the tube, tube sheets affixing the ends of the hollow fiber membranes, a baffle located between the tube sheets, and a shell surrounding the tube fibers, tube sheets, and baffle.

Contactors capable of separating fluids, for example, dissolved gas from water, have numerous industrial applications including rust prevention systems for boilers or power plant turbines; rust prevention systems for drinking water, cooling water, or hot water pipe lines; ultra-pure water sources for the electronics industry (e.g., rinsing semiconductor wafers during manufacture); ultra-sonic cleaning processes; water sources for food processing; and the like.

Current art-recognized approaches to prevent and control the cellular respiration, amplification, and colonization of aerobic heterotrophic pathogenic bacteria, such as *Legionella* and *Pseudomonas*, in premise plumbing systems, cooling towers and evaporative condensers rely upon the addition of oxidant-based disinfectants, such as chlorine.

Controlling and preventing the growth and amplification of aerobic heterotrophic bacteria, including specific waterborne pathogenic bacteria such as *Legionella* and *Pseudomonas*, as well as their associated biofilm, has relied upon the addition of various biocidal agents such as chlorine. Reliance upon oxidant-based disinfectants in potable water and utility water systems has several disadvantages. Primarily, as the oxidants perform the action of inactivating bacteria, and when they encounter organic debris and chemically active plumbing surfaces, the oxidants are consumed and no longer offer protective activity. Interactions with interior plumbing surfaces causes corrosion and can leach lead and copper from the wetted plumbing surfaces, leading to elevated water concentrations of lead and copper, and increased occurrence of plumbing water leaks. By-products of oxidant reactions with organic matter in the potable water include several carcinogenic compounds that include haloacetic acid and trihalomethanes.

Water conservation efforts that are often mandated by federal and local authorities result in longer residence time of water in municipal distribution lines and premise plumbing, often resulting in lower residual oxidant concentrations. When water is stagnant in building premise plumbing lines at warm temperatures, with inadequate residual oxidant concentrations, numerous pathogenic bacteria, including *Legionella, Pseudomonas*, Mycobacteria, and certain fungi, can colonize and pose a human health risk. Efforts to flush water through the premise plumbing water systems to increase oxidant levels of course defeats the water conservation efforts.

Most currently known strategies to prevent bacterial amplification in premise potable water systems rely upon addition of bactericidal chemical agents at doses low enough to not harm humans, but high enough to disrupt bacterial cellular respiration and amplification. These oxidizing bactericidal agents inherently and unavoidably cause corrosion of the plumbing materials and generate disinfectant by-products that can adversely impact the taste and safety of the water. All oxidizing bactericidal agents eventually are consumed through reactions with bacteria, organic matter in the water, or the wetted surfaces of plumbing materials. Where these oxidizing agents are most needed, in the water heating devices, the heat from the water accelerates their degradation.

Cooling towers and evaporative condensers are inherently prone to the colonization and growth of pathogenic aerobic bacteria, foremost *Legionella*. Many known outbreaks of Legionnaires disease have been attributed to contamination of cooling towers and evaporative condensers and the spread by *Legionella* bacteria. Current technologies to prevent the growth and colonization of these systems unavoidably causes corrosion and is rapidly consumed during normal operation. During relatively brief periods of suspended operation, if biocidal oxidants are not present at sufficient concentrations, *Legionella* bacteria can bloom, potentially causing a community-wide outbreak of disease.

Therefore, there is a need to utilize new and novel technologies to prevent and control the cellular respiration, amplification, and colonization of aerobic heterotrophic pathogenic bacteria, such as *Legionella* and *Pseudomonas*, in premise plumbing systems, cooling towers, and evaporative condensers used in commercial, residential, industrial, or health care buildings. It is towards fulfilling such a need that the embodiments disclosed herein are directed.

SUMMARY

Broadly, the embodiments disclosed herein are directed toward systems and methods to prevent or at least substantially control the amplification of bacteria within premise building plumbing of potable water systems, cooling towers, and evaporative condensers by removing dissolved oxygen from the water. Deoxygenation of potable and process water to achieve an anaerobic condition prevents the colonization, amplification, and cellular respiration of aerobic heterotrophic bacteria such as *Legionella* and *Pseudomonas*. For example, *Legionella* bacteria are obligate aerobes, meaning they require dissolved oxygen in order to metabolize and live. At dissolved oxygen concentrations below 1.7 to 2.2 mg/L (ppm) the pathogenic bacteria *Legionella pneumophila* has been documented to not be able to amplify or sustain colonies. Normal dissolved oxygen concentrations in potable water typically range from 8 to 10 mg/L (ppm), seldom reaching 15 mg/L. Hypoxic conditions are defined as dissolved oxygen concentrations below 2.0 mg/L (ppm). Anoxic conditions refer to dissolved oxygen concentrations of less than 0.5 mg/L (ppm).

Devices and methodologies to reduce or remove dissolved oxygen from water are available and commercially produced, but their applications and intended purpose have been limited to controlling corrosion, preventing rust in boilers or power plant turbines; rust prevention systems for drinking water, cooling water, or hot water pipe lines; ultra-pure water sources for the electronics industry (e.g., rinsing semiconductor wafers during manufacture); ultrasonic cleaning processes; water sources for food processing deoxidizing water fed to boilers and liquids fed to reverse osmosis membranes, and to produce super-pure water for semiconductor rinsing. Prior to the embodiments disclosed herein, no methods or systems have been devised that rely upon hypoxic or anoxic water conditions as a primary prevention measure for aerobic bacteria (i.e. *Legionella* and *Pseudomonas*) in premise plumbing for potable water systems or for process water used in cooling towers and evaporative condensers.

Reliance upon deoxygenated potable water has several advantages over supplemental treatment with oxidizing bactericidal agents such as chlorine. Additional production of disinfectant by-products is avoided. The accelerated corrosion of plumbing materials caused by oxidizing bactericidal agents is avoided and the potential for corrosion is reduced by the removal of dissolved oxygen. Water conservation measures can still be successfully implemented because low-flow and low water consumption in a building do not reduce the residual impact of this treatment approach. Potable water sitting in sealed premise plumbing systems will not become re-oxygenated until it is discharged from the point of use. Residual oxidants that are in the potable water will become more effective at inactivating viable aerobic bacteria due to the stress generated on the living organisms in this hypoxic or anoxic environment.

Preventing the amplification of aerobic pathogenic bacteria, such as *Legionella* and *Pseudomonas*, in premise plumbing systems, cooling towers and evaporative condensers is an important public health goal that is becoming more difficult to achieve as water conservation efforts are implemented and often mandated by regulatory authorities. By using existing methods and devices to safely remove dissolved oxygen from potable water at low energy and treatment costs, the amplification of aerobic waterborne pathogens can be prevented and controlled without accelerating internal corrosion or generating carcinogenic disinfectant by-products.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

In general, the embodiments disclosed herein will necessarily include a membrane contactor to remove oxygen from an incoming municipal water supply before it is distributed to fire-suppression systems, cooling towers, evaporative condensers, potable cold-water service, and water heaters or boilers so as to create at least a hypoxic (<2.0 mg/L dissolved oxygen) or anoxic (<0.5 mg/L dissolved oxygen) aqueous water source downstream of the contactor. Established bacterial biofilms and aerobic heterotrophic bacterial colonies will cease amplification, cellular respiration, and eventually become non-viable in such a hypoxic or anoxic water source. Aerobic heterotrophic bacteria, including *Legionella* and *Pseudomonas*, that are introduced from the incoming municipal water supply will thus not be able to colonize, amplify, metabolize, or establish biofilms within premise plumbing systems by virtue of the hypoxic or anoxic conditions of the water source downstream of the contactor. According to certain embodiments, the contactor will effect a downstream anoxic (<0.5 mg/L dissolved oxygen) water condition such that aerobic bacteria already in the plumbing systems will become metabolically dormant under such conditions.

Water with reduced dissolved oxygen concentrations may then be treated and used as untreated water would normally be. Installation of aerators at the point of water use (e.g., at water supply faucets where the water is discharged to the consumer) can re-introduce dissolved oxygen to improve perceived taste if desired. The aerator may therefore re-oxygenate the otherwise previously deoxygenated water at the point of discharge so that the discharged water has a dissolved oxygen concentration of greater than 2.0 mg/L, for example between about 5 mg/L to about 15 mg/L or between about 8 to about 10 mg/L. To ensure that membrane contactor performance is achieving desired results, an in-line real-time dissolved oxygen sensor can be installed in cold-water plumbing lines, hot water distribution lines, and recirculating utility water lines.

Figure 1:
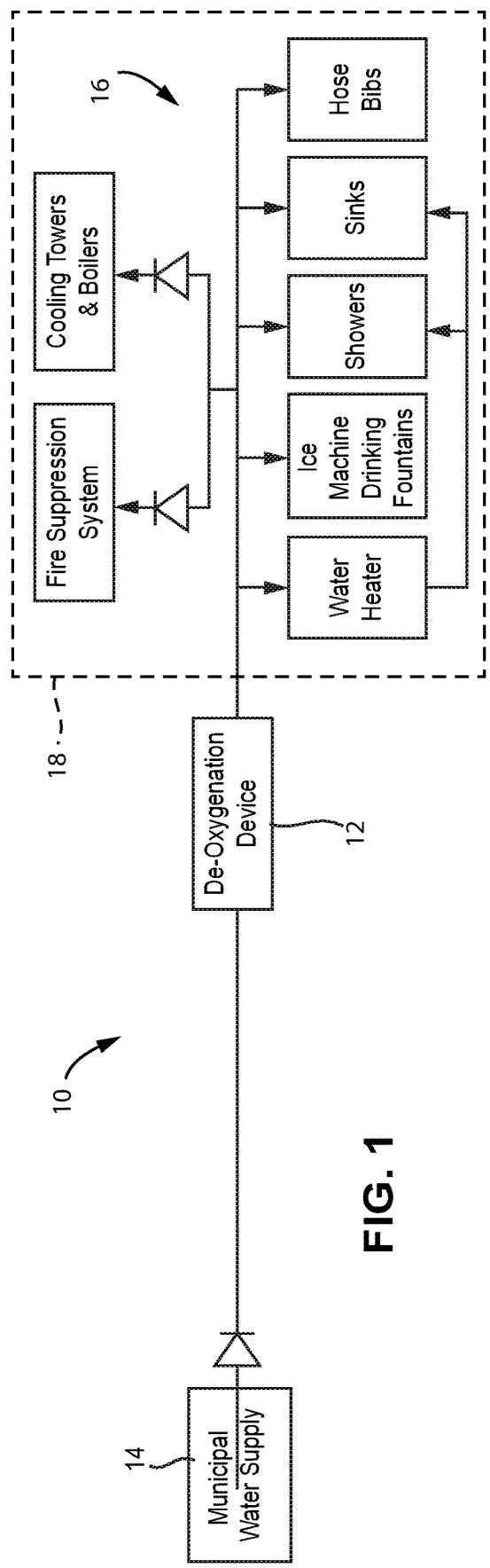
FIG. 1 is a schematic diagram showing an exemplary embodiment in accordance with the present invention.

Accompanying FIG. 1 shows a system 10 which embodies the present invention. As shown, the system 10 will include a deoxygenation device 12 positioned to receive potable water from the municipal potable water supply 14. The deoxygenation device 12 thereby delivers deoxygenated water having a dissolved oxygen concentration of less than 2.0 mg/L to achieve hypoxic water conditions, or less than 0.5 mg/L to achieve anoxic water conditions to the potable water supply system (noted generally by reference numeral 16) within the premise building 18.

Figure 2:
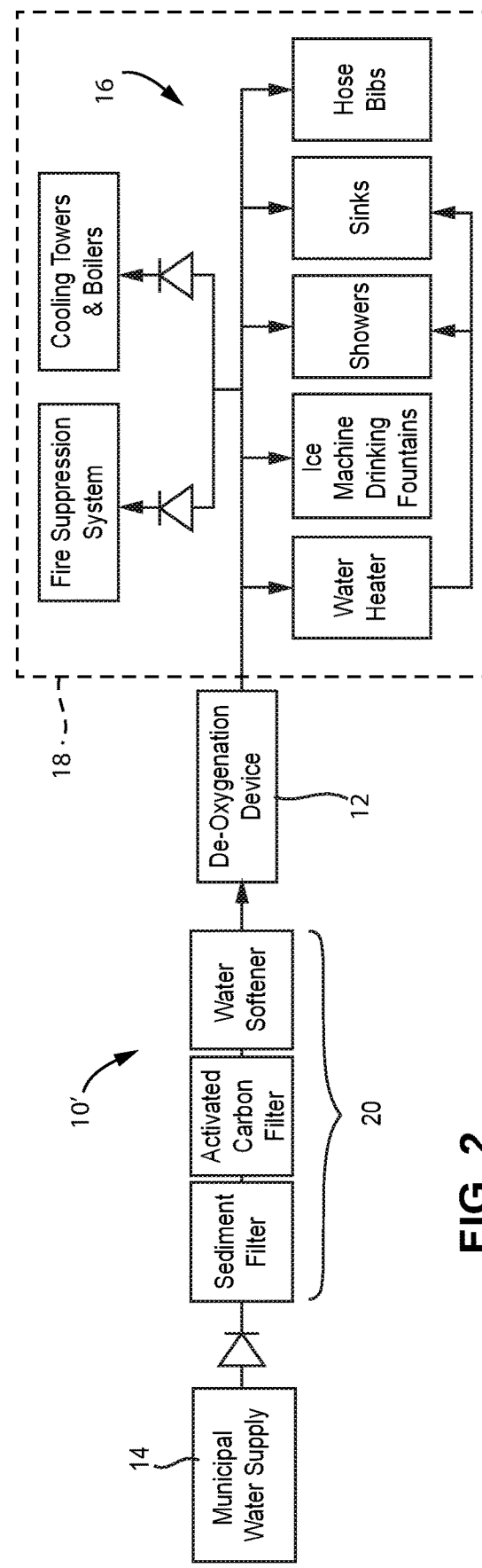
FIG. 2 is a schematic diagram showing another exemplary embodiment in accordance with the present invention.

The system 10 depicted in FIG. 2 is similar to that depicted in FIG. 1 (and thus the same reference numerals have been employed for the same features) with the principal exception being that a water-pretreatment system 20 which may include a sediment filter, an activated carbon filter and/or a water softener, is installed in the potable water conduit from the municipal water supply 14 upstream of the deoxygenating device 12. The pretreatment system 20 may thus be advantageously employed so that sediment and/or other dissolved particulates do not affect the deoxygenation functions of the deoxygenation device 12.

Figure 3:
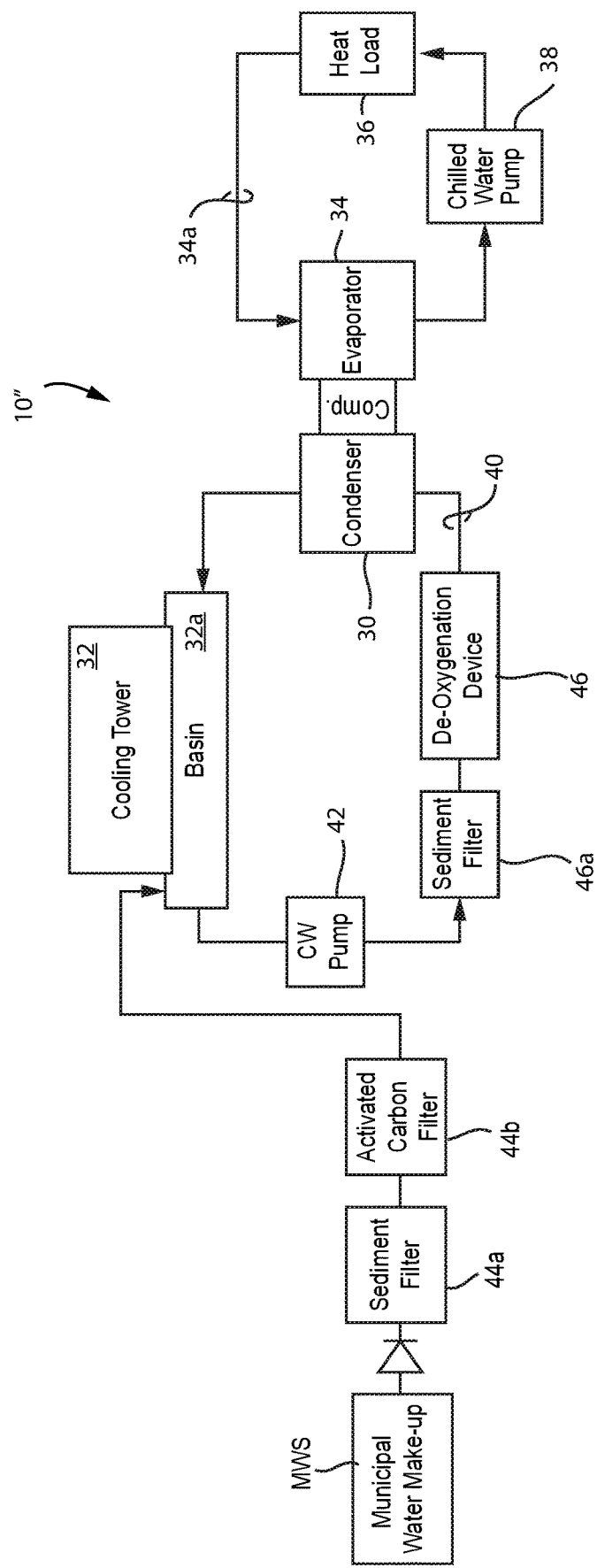
FIG. 3 is a schematic diagram showing an exemplary embodiment of a cooling tower/evaporative condenser installation in accordance with the present invention.

A cooling tower/evaporative condenser installation 10″ is depicted schematically in accompanying FIG. 3. As shown, the installation 10″ is provided with a condenser 30 which is operatively supplied with cold water from a cooling tower 32. The condenser 30 is in heat-exchange relationship with an evaporator 34 positioned within a cooling loop 34a circulation of chilled water providing a heat-exchange medium to remove heat from the heat load 36. A chilled water pump 38 is provided so as to circulate the chilled water within the cooling loop 34a.

As is conventional, the cooling tower 32 operates to provide cold water in the basis 32a which provides a supply of cold water that is circulated within the loop 40 by the cold water pump 42. Make-up water is supplied to the basin 32a from the municipal water supply MWS through a sediment filter 44a and an activated carbon filter 44b. A deoxygenation device 46 is positioned in the circulation loop 40 so as to receive the cold water from the basin 32a of the cooling tower 32. The deoxygenation device 46 thereby delivers deoxygenated cold water having a dissolved oxygen concentration of less than 2.0 mg/L to achieve hypoxic water conditions, or less than 0.5 mg/L to achieve anoxic water conditions to the condenser 30 and thereby ensures that deoxygenated cold water circulates within the loop 40. If desired, a sedimentation filter 46a may be positioned upstream of the deoxygenation device 46 to remove particulates that may be present in the cold water within the loop 40.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method to prevent colonization, amplification and/or growth of waterborne aerobic heterotrophic bacteria within a potable water plumbing system of a premises comprising:
   (i) supplying potable water to the potable water plumbing system of the premises from a municipal potable water source having a dissolved oxygen content from 8 to 15 mg/L and containing established colonies of waterborne aerobic heterotrophic bacteria;
   (ii) passing the supply of potable water from the municipal potable water source through a hollow fiber membrane deoxygenation device operatively associated with the potable water plumbing system to deoxygenate the supply of potable water from the municipal potable water supply to at least hypoxic dissolved oxygen concentrations of less than 2.0 mg/L to thereby provide a downstream supply of deoxygenated water to the potable water plumbing system of the premises sufficient to prevent colonization, amplification and/or growth of the waterborne aerobic heterotrophic bacteria supplied to the potable water plumbing system by the potable water from the municipal potable water source.

2. The method according to claim 1, wherein step (ii) is practiced by deoxygenating the supply water to anoxic dissolved oxygen concentrations of less than 0.5 mg/L.

3. The method according to claim 1, wherein the potable water plumbing system comprises at least one of a fire suppression system, a cooling tower, a boiler, a water heater, a sink faucet, an ice machine, a drinking fountain and a hose bib.

4. The method according to claim 1, which further comprises passing the supply of potable water through a water-pretreatment system positioned upstream of the hollow fiber membrane deoxygenation device.

5. The method according to claim 4, wherein the water-pretreatment system comprises a sediment filter, an activated carbon filter and/or a water softener.

6. The method according to claim 1, wherein the potable water plumbing system of the premises comprises:
   a water heater to provide a source of potable heated water, and
   a water discharge for discharging the potable heated water from the water heater, and wherein
   the method further comprises providing an aerator at the water discharge to aerate the potable heated water and re-oxygenate the potable heated water discharged through the water discharge to a dissolved oxygen concentration of greater than 2.0 mg/L.

7. The method according to claim 6, wherein the aerator re-oxygenates the potable heated water discharged through the water discharge to a dissolved oxygen concentration of between about 5 mg/L to about 15 mg/L.

8. The method according to claim 6, wherein the aerator re-oxygenates the potable heated water discharged through the water discharge to a dissolved oxygen concentration of between of between about 8 mg/L to about 10 mg/L.

* * * * *